US008160649B2

(12) United States Patent
Kuhl et al.

(10) Patent No.: US 8,160,649 B2
(45) Date of Patent: Apr. 17, 2012

(54) INITIATING A CALL FROM A MOBILE DEVICE TO A NUMBER THAT IS NOT HYPERLINKED

(75) Inventors: Lawrence E. Kuhl, Waterloo (CA); Mihal Lazaridis, Waterloo (CA); Harry R. Major, Waterloo (CA); Andrew D. Bocking, Waterloo (CA)

(73) Assignee: Research In Motion Limited, Waterloo (CA)

( * ) Notice: Subject to any disclaimer, the term of this patent is extended or adjusted under 35 U.S.C. 154(b) by 31 days.

(21) Appl. No.: 12/559,760

(22) Filed: Sep. 15, 2009

(65) Prior Publication Data

US 2010/0004032 A1    Jan. 7, 2010

Related U.S. Application Data

(63) Continuation of application No. 11/278,310, filed on Mar. 31, 2006, now Pat. No. 7,606,598.

(51) Int. Cl.
*H04B 1/38* (2006.01)
(52) U.S. Cl. ...... 455/564; 455/566; 455/90.3; 455/66.1; 455/550.1
(58) Field of Classification Search .................. 455/564, 455/566, 90.3, 66.1, 550.1, 566.1
See application file for complete search history.

(56) References Cited

U.S. PATENT DOCUMENTS

| 5,402,481 | A | | 3/1995 | Walman |
| 5,692,032 | A | | 11/1997 | Seppanen et al. |
| 5,815,142 | A | * | 9/1998 | Allard et al. ................. 345/173 |
| 5,841,849 | A | | 11/1998 | Macor |
| 5,999,827 | A | | 12/1999 | Sudo et al. |
| 6,047,196 | A | | 4/2000 | Makela et al. |
| 6,055,439 | A | | 4/2000 | Helin et al. |
| 6,192,123 | B1 | | 2/2001 | Grunsted et al. |
| 6,201,534 | B1 | | 3/2001 | Steele et al. |
| 6,292,473 | B1 | | 9/2001 | Duske et al. |
| 6,314,094 | B1 | | 11/2001 | Boys |
| 6,535,506 | B1 | | 3/2003 | Narain et al. |
| 6,570,596 | B2 | | 5/2003 | Frederiksen |
| 6,721,418 | B1 | | 4/2004 | Yun |
| 6,741,855 | B1 | | 5/2004 | Martin et al. |

(Continued)

FOREIGN PATENT DOCUMENTS

CN    1283034 A2    2/2001

(Continued)

OTHER PUBLICATIONS

European Patent Office, Summons to Attend Oral Proceedings Pursuant to Rule 71(1) EPC for application No. 04253180.6, Apr. 27, 2006.

(Continued)

*Primary Examiner* — Tuan Pham
(74) *Attorney, Agent, or Firm* — Ridout & Maybee LLP

(57) ABSTRACT

A method and mobile device for initiating telephone calls through a wireless communication network are provided. Number strings are identified in text displayed on a visual display of the mobile device. Number strings may be hyperlinked when the strings meet predetermined criteria. The mobile device monitors for a predetermined user input and upon detecting the predetermined user input causes a list of user selectable functions to be displayed on the visual display. The list of user selectable functions includes a telephone call function for initiating a telephone call to a selected number string. A telephone call to the selected number string can be initiated through the wireless communications network when the telephone call function is selected.

19 Claims, 11 Drawing Sheets

U.S. PATENT DOCUMENTS

| | | | |
|---|---|---|---|
| 6,917,822 | B1 | 7/2005 | Mori et al. |
| 7,003,260 | B1 | 2/2006 | Kessler et al. |
| 7,111,056 | B1 | 9/2006 | Ramey et al. |
| 7,139,370 | B1 | 11/2006 | Tse |
| 2002/0128036 | A1 | 9/2002 | Yach et al. |
| 2002/0164000 | A1 | 11/2002 | Cohen et al. |
| 2003/0076292 | A1 | 4/2003 | Griffin et al. |
| 2003/0130864 | A1 | 7/2003 | Ho et al. |
| 2003/0228004 | A1 | 12/2003 | Rupp |
| 2004/0119685 | A1 | 6/2004 | Harries et al. |
| 2005/0097189 | A1 | 5/2005 | Kashi |
| 2005/0182767 | A1 | 8/2005 | Shoemaker et al. |
| 2005/0266889 | A1 | 12/2005 | Kuhl et al. |
| 2007/0207834 | A1 * | 9/2007 | Thijssen et al. ............... 455/557 |

FOREIGN PATENT DOCUMENTS

| | | |
|---|---|---|
| CN | 2631166 | 8/2004 |
| EP | 0961461 A1 | 1/1999 |
| EP | 0951163 A2 | 10/1999 |
| EP | 1193621 A2 | 10/2001 |
| JP | 2001154777 | 6/2001 |
| WO | WO 98/35481 | 8/1998 |
| WO | WO 01/22680 A2 | 3/2001 |
| WO | WO 02/35808 A2 | 5/2002 |

OTHER PUBLICATIONS

"Instruction handbook for J-SH008, J-sky", Dec. 2001, pp. 10-22 and 58, 1st Ed., J-phone Co. ltd.

"Internet Explorer 4.0 Accessibility", Oct. 1997, pp. 1-27, Microsoft Corporation.

Blackberry Wireless Handheld Manual, Dual Band 900/1800 MHz GSM/GPRS Networks, Version 3.0, Nov. 6, 2001.

Sprint Online User's Guide PCS Phone Handspring Treo 300 User Guide, Handspring, 2002.

Motorola Motamanual V3 GSM User's Guide, pp. 1-134, Motorola Inc., 2004.

Oral Proceedings Decision for EPO Patent Application No. 04253180.6, Dated Feb. 6, 2009.

Summons to Oral Proceedings for EPO Patent Application No. 04253180.6, Dated Jul. 23, 2008.

Summons to Oral Proceedings for EPO Patent Application No. 06122386.3, Dated Mar. 12, 2009.

Examination Report from the Patent Office of the Government of India in corresponding application No. 1273/DEL/2005, dated Nov. 9, 2010.

Canadian Office Action mailed Mar. 14, 2011, for Canadian Application No. 2,508,507, filed May 27, 2005 (4 pages).

* cited by examiner

INITIATING A CALL FROM A MOBILE DEVICE TO A NUMBER THAT IS NOT HYPERLINKED

CROSS-REFERENCE TO RELATED APPLICATIONS

This application is a continuation of U.S. patent application Ser. No. 11/278,310, filed Mar. 31, 2006, the content of which is incorporated herein by reference.

TECHNICAL FIELD

Mobile devices which operate in wireless communication networks, and more particularly to user interface methods and apparatus for initiating telephone calls from a mobile device.

BACKGROUND

Mobile communication devices, such as cellular telephones or mobile e-mail devices, are becoming increasingly ubiquitous. Many present-day mobile devices provide easy-to-use user interfaces for the input and output of user information. For example, a mobile device may provide an interactive graphical user interface (GUI) for several primary applications of the mobile device (e.g. e-mail or Web browsing applications). Conventionally, however, the user interface may not provide a suitable interface for both voice telephony and data/text applications. To minimize operating confusion, there has often been the need to provide consistency in the user interface for both voice and data/text applications. Data/text applications, however, are typically more complex than the voice application. Thus, it would be advantageous to simplify the user interface of the mobile device for initiating telephone calls for convenience and ease-of-use so as to overcome the deficiencies in the prior art.

BRIEF DESCRIPTION OF THE DRAWINGS

Embodiments will now be described by way of example with reference to attached figures, wherein.

DETAILED DESCRIPTION OF EXAMPLE EMBODIMENTS

Figure 1:
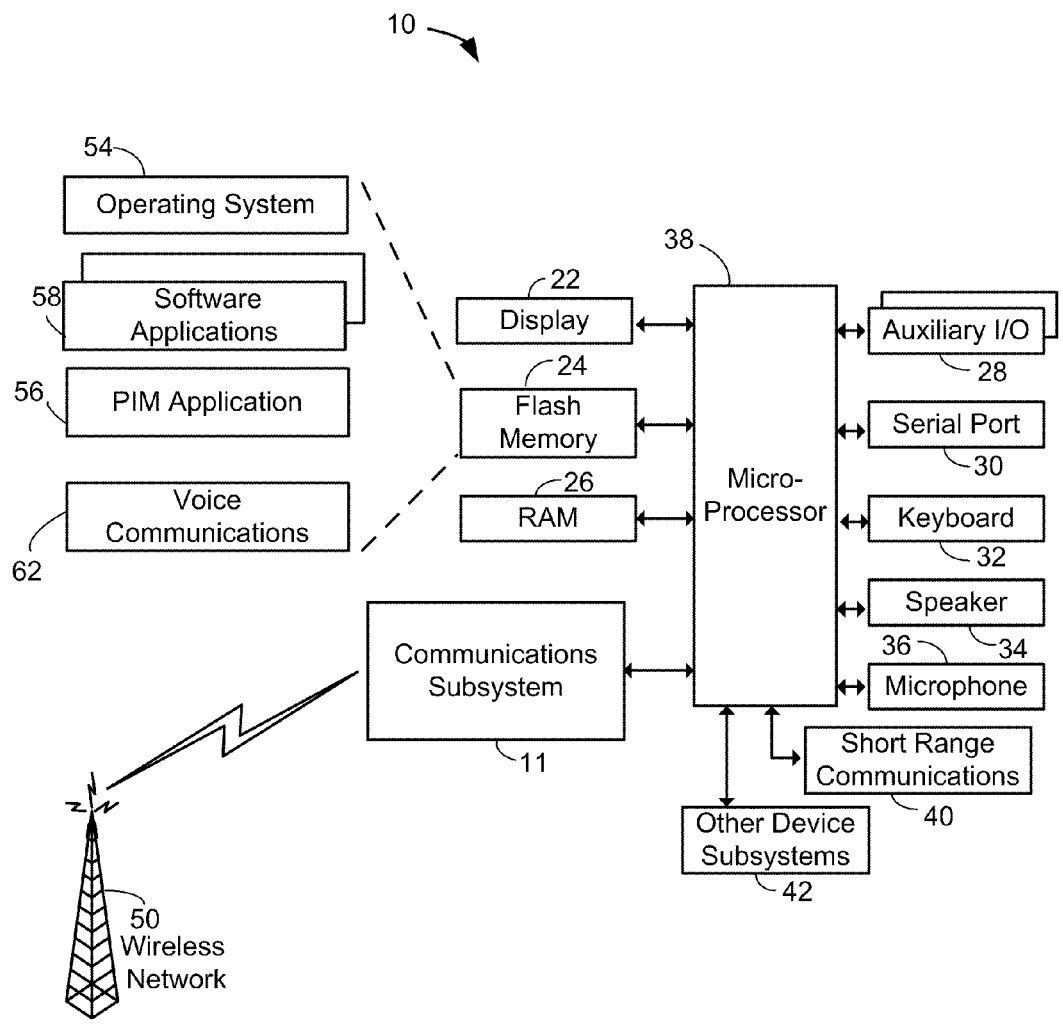
FIG. 1 is a block diagram which illustrates pertinent components of a mobile device to which embodiments described in this application may be applied.

In accordance with one example embodiment, there is provided a mobile device comprising: a controller including at least one processor; a wireless transceiver connected to the controller for exchanging signals with a wireless communications network; a user interface connected to the controller for receiving user input; a storage connected to the controller and storing data items that include text containing number strings; a visual display connected to the controller for displaying the text of data items stored in the storage; the controller being operative to: receive a selection input through the user interface to display a data item comprising an electronic message on the visual display; detect any number strings within at least a portion of the data item and compare the detected number strings to first predetermined criteria to identify telephone number strings in the detected number strings; display the electronic message on the visual display, wherein each number string in the electronic message identified as a telephone number string is displayed as a selectable hyperlinked number string, wherein each number string not identified as a telephone number string is displayed as a selectable non-hyperlinked number string; move a position marker on the visual display throughout the displayed text in response to navigational input through the user interface; monitor for a predetermined user input through the user interface and upon detecting the predetermined user input cause a list of user selectable functions to be displayed on the display; determine, in dependence on the location of the position marker, if a hyperlinked number string is selected when the predetermined user input is detected and if so, cause the displayed list of user selectable functions to include a telephone call function for initiating a telephone call to the selected hyperlinked number string, and cause, if the telephone call function for the hyperlinked number string is selected from the list of user selectable functions, a telephone call to the hyperlinked number string to be initiated through the wireless communications network; and determine, in dependence on the location of the position marker, if a non-hyperlinked number string is selected when the predetermined user input is detected and if so, compare the non-hyperlinked number string against second predetermined criteria to determine if the non-hyperlinked number string is a callable number string, and if the non-hyperlinked number string is determined to be a callable number string, cause the displayed list of user selectable functions to include a telephone call function for initiating a telephone call to the non-hyperlinked number string, and cause, if the telephone call function for the non-hyperlinked number string is selected from the list of user selectable functions, a telephone call to the non-hyperlinked number string to be initiated through the wireless communications network.

In accordance with another example embodiment, there is provided a method for initiating telephone calls from a mobile device which operates in a wireless communication network, the mobile device comprising a controller including at least one processor, a user interface connected to the controller for receiving user input, a storage connected to the controller and storing data items that include text containing number strings and a visual display connected to the controller for displaying the text of data items stored in the storage, the method comprising: detecting any number strings within at least a portion of the text of a selected data item; determining whether any detected number strings are telephone number strings according to first predetermined criteria; causing the text of the selected data item to be displayed on the visual display, wherein each number string determined to be a telephone number string is displayed as a selectable hyperlinked number string; monitoring for a predetermined user input through the user interface and, upon detecting the predetermined user input, cause a list of user selectable functions to be displayed on the visual display; determining if a hyperlinked number string is selected when the predetermined user input is detected and if so, cause the displayed list of user selectable functions to include a telephone call function for initiating a telephone call to the selected hyperlinked number string; and causing a telephone call to be initiated to the hyperlinked number string through the wireless communications network when the telephone call function for the hyperlinked number string is selected from the list of user selectable functions.

In accordance with a further example embodiment, there is provided a mobile device comprising: a controller including at least one processor; a wireless transceiver connected to the controller for exchanging signals with a wireless communications network; a user interface connected to the controller for receiving user input; a storage connected to the controller and storing data items that include text containing a number string; a visual display connected to the controller for displaying the text of data items stored in the storage; the controller being operative to: cause the text of the data item to be displayed on the visual display of the mobile device, the text including the number string; cause a position marker to move on the visual display throughout the displayed text in response to navigational input through the user interface; monitor for a predetermined user input through the user interface and upon detecting the predetermined user input cause a list of user selectable functions to be displayed on the visual display, wherein the displayed list of user selectable functions includes a telephone call function for initiating a telephone call to the number string when the position marker is located within the number string in the displayed text and the number string meets predetermined criteria; and cause a telephone call to the number string to be initiated through the wireless communications network when the telephone call function for the number string is selected from the list of user selectable functions.

In accordance with a further example embodiment, there is provided a method for initiating telephone calls from a mobile device which operates in a wireless communication network, the method including: displaying text on a visual display of the mobile device; moving a position marker on the visual display throughout the displayed text in response to a navigational input by a user to the mobile device; monitoring for a predetermined user input to the mobile device and upon detecting the predetermined user input causing a list of user selectable functions to be displayed on the visual display; determining if the position marker is located within a non-hyperlinked number string in the displayed text when the predetermined user input is detected and if so, causing the displayed list of user selectable functions to include a telephone call function for initiating a telephone call to the non-hyperlinked number string; and causing, if a user selects from the list of functions the initiate a telephone call function, a telephone call to the non-hyperlinked number string to be initiated through the wireless communications network.

In accordance with a further example embodiment, there is provided a mobile device that includes a controller including at least one processor, a wireless transceiver coupled to the controller for exchanging signals with a wireless communications network, a user interface coupled to the controller for receiving user input, a storage coupled to the controller and storing data items that include text containing number strings, and a visual display coupled to the controller for displaying the text of data items stored in the storage. The controller is operative to: cause text of a user selected data item to be displayed on the visual display of the mobile device; cause a position marker to move on the visual display throughout the displayed text in response to a navigational input by a user through the user interface; monitor for a predetermined user input to the mobile device through the user interface and upon detecting the predetermined user input cause a list of user selectable functions to be displayed on the visual display; determine if the position marker is located within a non-hyperlinked number string in the displayed text when the predetermined user input is detected and if so, cause the displayed list of user selectable functions to include a telephone call function for initiating a telephone call to the non-hyperlinked number string; and cause, if a user selects from the list of functions the initiate a telephone call function, a telephone call to the non-hyperlinked number string to be initiated through the wireless communications network.

In accordance with a further example embodiment, there is provided a method for initiating telephone calls from a mobile device which operates in a wireless communication network, including: receiving an selection input from a user through a user interface of the mobile device to display an electronic message on a display of the device; scanning a text portion of the electronic message to detect any number strings contained therein and comparing the detected number strings against first criteria to identify telephone number strings from among the identified number strings; displaying the electronic message on the display and causing a user selectable hyperlink to be created for each number string in the electronic message identified as being a telephone number string, wherein any number strings not identified as telephone number strings are displayed as non-hyperlinked number strings; moving a position marker on the display throughout the displayed text in response to a navigational input by a user through the user interface of the mobile device; monitoring for a predetermined user input through a user interface of the mobile device and upon detecting the predetermined user input causing a list of user selectable functions to be displayed on the visual display; determining, in dependence on the location of the position marker, if a hyperlinked telephone number string is selected by a user when the predetermined user input is detected and if so, causing the displayed list of user selectable functions to include a telephone call function for initiating a telephone call to the selected hyperlinked telephone number string, and causing, if a user selects from the list of functions the initiate a telephone call to the selected hyperlinked telephone number string, a telephone call to the hyperlinked telephone number string to be initiated through the wireless communications network; and determining if the position marker is located within a non-hyperlinked number string in the displayed text when the predetermined user input is detected and if so, comparing the non-hyperlinked number string against further criteria to identify if the non-hyperlinked number string is a callable number string, and if the non-hyperlinked number string is identified as being a callable number string, causing the displayed list of user selectable functions to include a telephone call function for initiating a telephone call to the non-hyperlinked number string, and causing, if a user selects from the list of functions the initiate a telephone call to the non-hyperlinked number string function, a telephone call to the non-hyperlinked number string to be initiated through the wireless communications network.

FIG. 1 is a block diagram of a user device to which example embodiments of the present disclosure can be applied. In at least one example, the user device is a two-way mobile communication device 10 having data and voice communication capabilities, including the capability to communicate with other computer systems via a wireless network 50. Depending on the functionality provided by the device 10, in various embodiments the device may be a data messaging device, a multiple-mode communication device configured for both data and voice communication, a mobile telephone, a PDA enabled for wireless communication, or a computer system with a wireless modem, among other things.

In the illustrated embodiment, the device 10 includes a wireless communication subsystem 11. In one embodiment, the communication subsystem 11 may include a receiver, a transmitter, and associated components such as one or more, preferably embedded or internal, antenna elements, and a processing module such as a digital signal processor (DSP). As will be apparent to those skilled in the field of communications, the particular design of the communication subsystem 11 will be dependent in part upon the communication network in which the device 10 is intended to operate.

Signals received by the device 10 from a wireless communication network 50 are input to the receiver of the communication subsystem 11, which may perform such common receiver functions as signal amplification, frequency down conversion, filtering, channel selection and the like. In a similar manner, signals to be transmitted are processed, including modulation and encoding for example, by the DSP and input to the transmitter for digital to analog conversion, frequency up conversion, filtering, amplification and transmission over the wireless communication network 50.

The device 10 includes a controller in the form of a microprocessor 38 that controls the overall operation of the device. The microprocessor 38 interacts with the communications subsystem 11 and also interacts with further device subsystems such as a display 22, flash memory 24, random access memory (RAM) 26, auxiliary input/output (I/O) subsystems 28, serial port 30, keyboard or keypad 32, speaker 34, microphone 36, a short-range communications subsystem 40, and any other device subsystems generally designated as 42. In some embodiments, the device 10 can include multiple microprocessors 38 for implementing a controller for the device 10.

Operating system software 54 and various software applications 58 used by the microprocessor 38 are, in one example embodiment, stored in a persistent store such as flash memory 24 or similar storage element. Those skilled in the art will appreciate that the operating system 54, software applications 58, or parts thereof, may be temporarily loaded into a volatile store such as RAM 26. It is contemplated that received communication signals may also be stored to RAM 26.

The microprocessor 38, in addition to its operating system functions, can enable execution of software applications 58 on the device. A predetermined set of software applications 58 which control basic device operations, including data communications applications and voice communication applications 62 for example, will normally be installed on the device 10 during manufacture. Further software applications 58 may also be loaded onto the device 10 through the network 50, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

Included among software applications 58 are computer instructions for executing the user interface techniques described herein. One application which is loaded onto mobile device 10 may be a personal information manager (PIM) application 56 having the ability to organize and manage data items relating to e-mail messages and voicemail messages, as well as address book data, calendar data and tasks data. One or more memory stores are available on mobile device 10 (and/or a SIM card associated with the device) to facilitate storage of PIM data items and other information. The PIM application 56 in an example embodiment has the ability to send and receive data items via the wireless network 50. In an example embodiment, PIM data items are seamlessly integrated, synchronized, and updated via the wireless network, with the mobile device user's corresponding data items stored and/or associated with a host computer system thereby creating a mirrored host computer on mobile device 10 with respect to such items.

In a data communication mode, a received signal such as a text message or web page download will be processed by the communication subsystem 11 and input to the microprocessor 38, which will preferably further process the received signal for output to the display 22 through the graphics subsystem 44, or alternatively to an auxiliary I/O device 28. A user of device 10 may also compose data items within a software application 58, such as e-mail messages for example, using the keyboard 32 in conjunction with the display 22 and possibly an auxiliary I/O device 28 such as, for example, a thumbwheel or scroll wheel. Such composed items may then be transmitted over a communication network through the communication subsystem 11.

For voice communications, the overall operation of mobile device 10 is substantially similar, except that the received signals would be output to speaker 34 and signals for transmission would be generated by microphone 36. Alternative voice or audio I/O subsystems, such as a voice message recording subsystem, may also be implemented on mobile device 10. Although voice or audio signal output is in an example embodiment accomplished primarily through speaker 34, display 22 may also be used to provide an indication of the identity of a calling party, duration of a voice call, or other voice call related information, as some examples.

A short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices. The device 10 may be a handheld device.

Wireless mobile network 50 is, in an example embodiment, a wireless wide area packet data network, which provides radio coverage to mobile devices 10. Wireless mobile network 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems). In some example embodiments, network 50 is a wireless local area network (WLAN) operating, for example, in conformance with one or more IEEE 802.11 protocols. In some example embodiments, the device 10 is configured to communicate over both wireless wide area networks and wireless local area networks and can include separate communications subsystems for implementing such communications.

Figure 2:
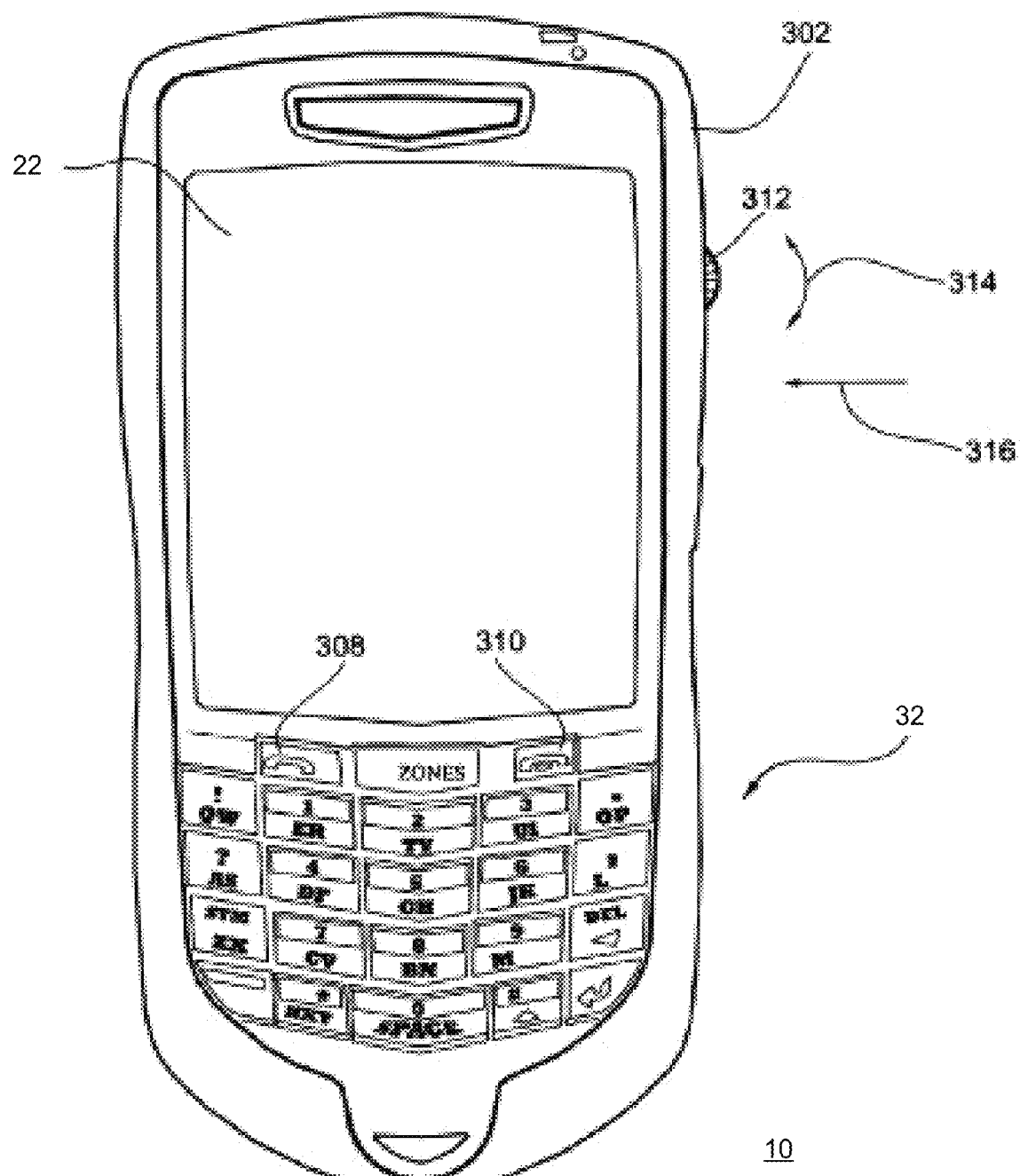
FIG. 2 is an illustration of a front side of an exemplary mobile device showing a user interface which includes a visual display and a plurality of keys.

FIG. 2 is a visual illustration of a front side of an exemplary mobile device 10 which may be used for the user interface techniques described herein. Mobile device 10 of FIG. 2 has a housing 302 which contains the electronic circuitry and components shown and described in relation to FIG. 1. Housing 302 of mobile device 10 includes a user interface having visual display 22 and keypad 32 with a plurality of keys as generally earlier shown and described in relation to FIG. 1. As will be revealed in more detail in relation to FIGS. 5-9, visual display 22 is used to visually display information and messages for the end user. As shown in FIG. 2, the plurality of keys of keypad 32 include a plurality of telephone digit keys (0, 1, 2, 3, 4, 5, 6, 7, 8, 9, *, and #) as well as control keys including a SEND key 308 (having a telephone handset icon inscribed thereon) and an END key 310 (having a telephone handset hang-up icon inscribed thereon). SEND and END keys 308 and 310 are mechanical switches of the mobile device which are detectable at switch inputs of the mobile device. In general, SEND key 308 is used by the end user for initiating a telephone call from mobile device 10 through the wireless network 50, and END key 310 is used by the end user for terminating the telephone call. Note that in the illustrated embodiment both SEND and END keys 308 and 310 are carried and exposed on a front side of housing 302. SEND key 308 may be alternatively designated as an ENTER key, an OK key, a START key, an ACCEPT key, etc.; similarly, END key 310 may be alternatively designated as a STOP key, a NO key, a DECLINE key, etc. Note that SEND and END keys 308 and 310 may alternatively be visual objects which are displayed in visual display 22 and detectable to the touch if visual display 22 is a touch screen display or other similar input device.

Given the relatively large size of visually displayed information and the compact size of visual display 22, information and messages are typically only partially presented in the limited view of visual display 22 at any given moment. Thus, mobile device 10 of FIG. 2 also includes an information viewing/selection mechanism for use with visual display 22. In the present embodiment, the information viewing/selection mechanism of mobile device 10 is a scrollwheel 312. Scrollwheel 312 is positioned on a right hand side of housing 302. Scrollwheel 312 generally includes a circular disc which is rotatable about a fixed axis of housing 302, and may be rotated by the end user's index finger or thumb. See the directions indicated by a rotation arrow 314 of scrollwheel 312 shown in FIG. 3. When the information or message is being partially displayed, an upwards rotation of scrollwheel 312 causes an upwards scrolling such that visual display 22 presents viewing of an upper portion of the information or message. Similarly, a downwards rotation of scrollwheel 312 causes a downwards scrolling such that visual display 22 presents viewing of a lower portion of the information or message. Note also that scrollwheel 312 is mounted along a fixed linear axis such that the end user can depress scrollwheel 312 inwards toward housing 312 (e.g. with the end user's index finger or thumb) for selection of information. See the directions indicated by an arrow 316 of scrollwheel 312 shown in FIG. 3.

Figure 3:
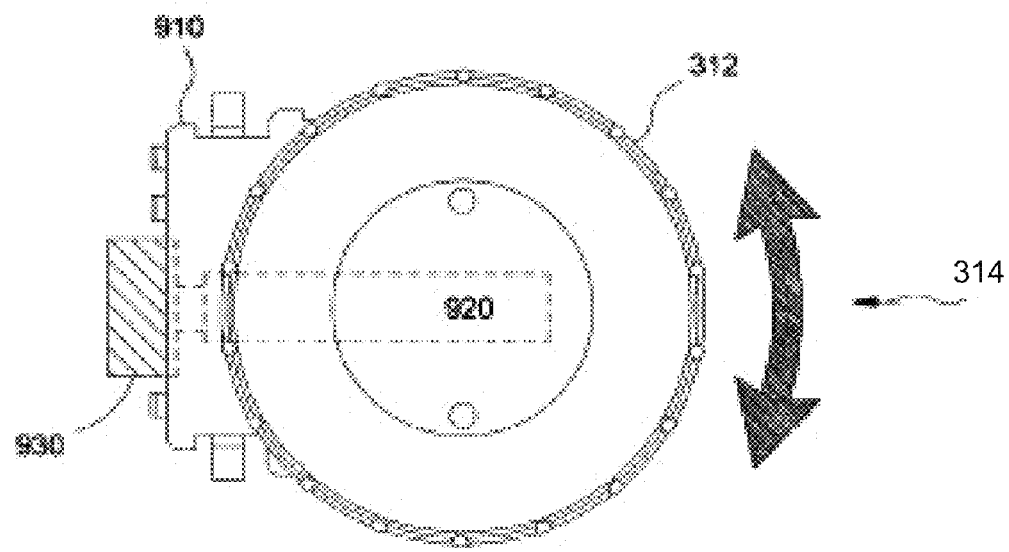
FIG. 3 is a plan view of the scrollwheel that may be utilized in the mobile device.

A more detailed mechanism for scrollwheel 312 is now described in relation to FIGS. 2 and 3. Scrollwheel 312 of FIGS. 2 and 3 is shown connected to and rotatable about a body assembly 910. Body assembly 910 may be connected to or be part of a slide assembly 920. Slide assembly 920 allows the entirety of scrollwheel 312 and body assembly 910 to move freely laterally 316 with respect to the handheld device. Lateral scrollwheel movement 316 is defined as movement along a plane normal to the rotational axis of scrollwheel 312. To control this lateral movement 316, slide assembly 920 may be connected to a control mechanism such as a cam mechanism 930 with a cam 931, or alternatively a level mechanism, a solenoid mechanism, or some other actuating means. Cam mechanism 930 is connected to a cam controller 940 (FIG. 4 only) responsible for controlling a lateral position of scrollwheel 312. As cam 931 connected to cam mechanism 930 and slide assembly 920 moves, scrollwheel 312 and body assembly 910 accordingly move laterally. Such lateral movement inwards toward the housing is detectable by the processor of the mobile device as a switch input (actuation or depression of the scrollwheel key).

Figure 4:
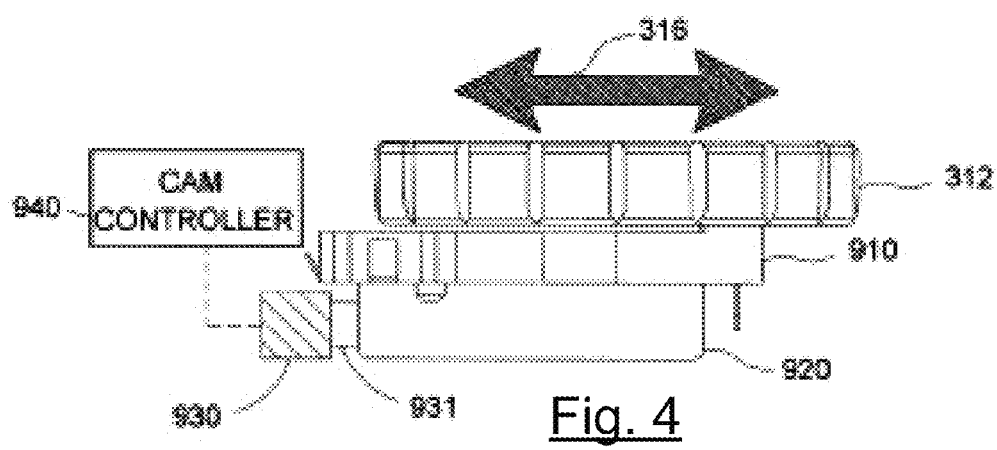
FIG. 4 is a side view of the scrollwheel of the mobile device.

Although scrollwheel 312 of FIGS. 2, 3, and 4 has been shown and described as one mechanism for use in viewing and selecting visually displayed information, any suitable viewing/selection mechanism may be utilized for the present user interface techniques to be described, such as UP and DOWN keys, a mouse and cursor mechanism, a touch pad mechanism or a touch screen display mechanism. Additionally, viewing/selection mechanisms with a depressible rotatable wheel or ball as the user input interface having a configuration that varies from that shown in FIGS. 3 and 4 could also be used.

Figure 5:
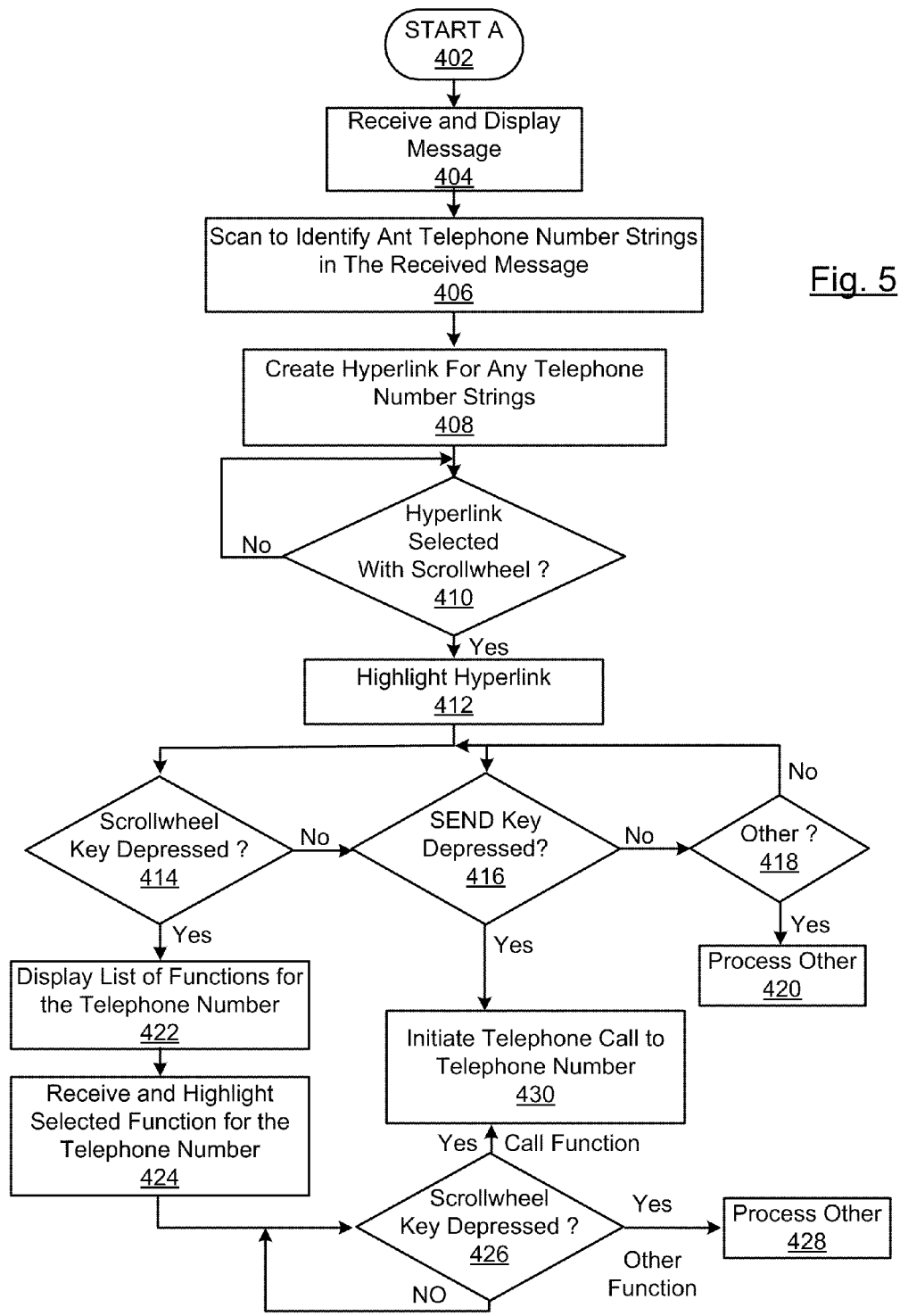
FIG. 5 is a flowchart which describes a user interface method of initiating telephone calls from the mobile device of FIGS. 1-2.

FIG. 5 is a flowchart for describing a user interface method of initiating telephone calls from a mobile device of the present application. The method may be performed with use of a mobile device operating in the wireless network as described in relation to FIG. 2. In combination with the flowchart of FIG. 5, reference will be made to the visual illustrations of the mobile device in FIGS. 2-4 and 6-9. A computer program product for the mobile device may include computer instructions stored on a storage medium (memory, a floppy disk or CD-ROM) which are written in accordance with the described logic of this method.

Beginning at a start block 402 of FIG. 5 ("Start A"), a message is received through a wireless receiver of the mobile device and displayed in a visual display (step 404 of FIG. 5). The message may be an electronic mail (e-mail) message or information of a web page, as examples. The message may include a telephone number string in a conventional telephone number format. For example, the telephone number string may be "888-2121" or "519-888-2121" which is suitable telephone number formats for the U.S. or Canada. This telephone number string is part of the information or message entered by the author of the message, and is typically located at or near an end or the message, but could also be located anywhere throughout the message. Note that this message is selected by the end user from a plurality of previously received messages for visual display. When the message is visually displayed, a processor of the mobile device scans to identify any telephone number strings in the message (step 406 of FIG. 5). If a telephone number string is identified in the message, the processor creates a hyperlink for the telephone number string (step 408 of FIG. 5). The hyperlink for the telephone number string is appropriately identified as such in the visually displayed message, such as by underlining, marking, or otherwise emphasizing the telephone number string in the visual display of information.

Figure 6:
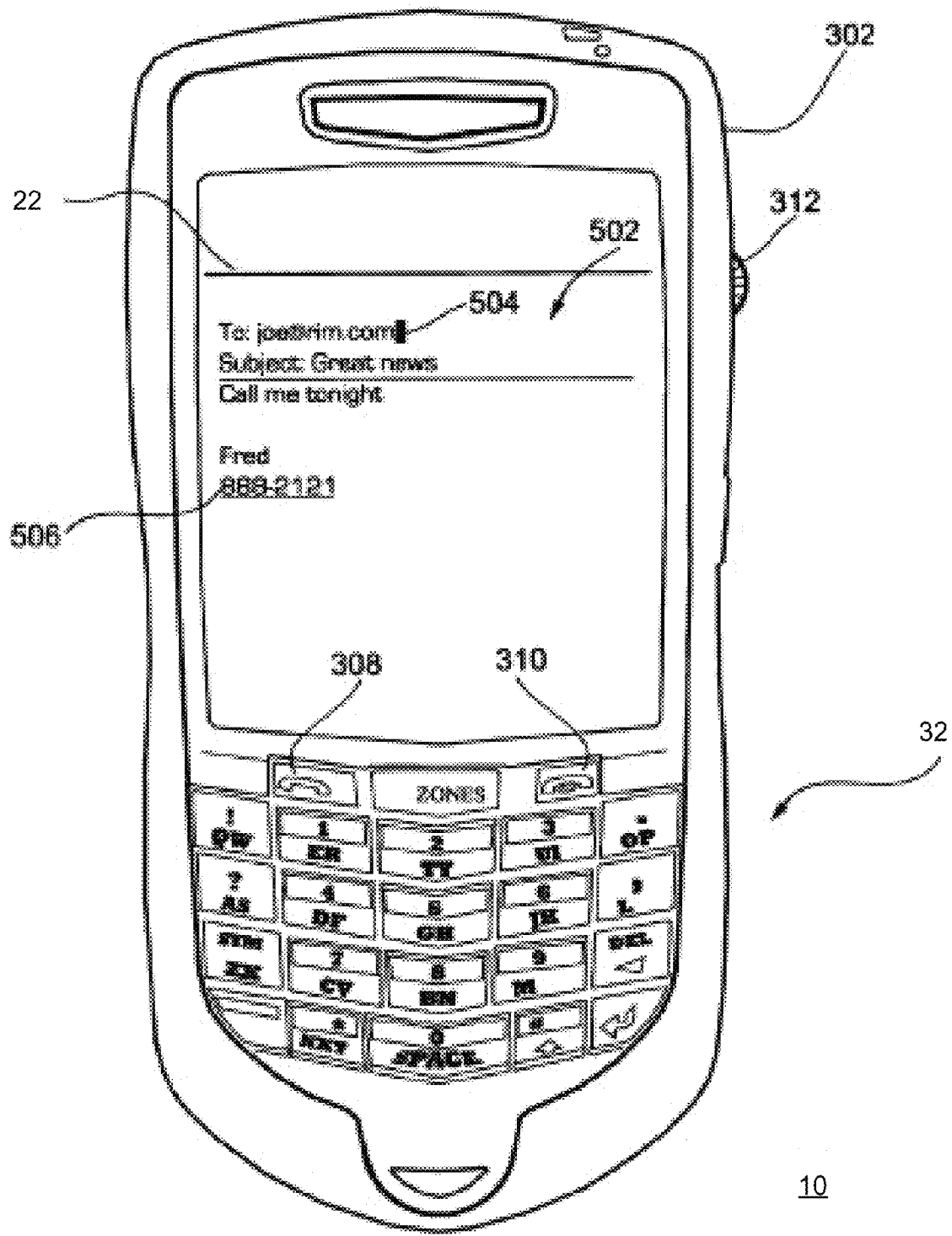
FIG. 6 is an illustration of the mobile device of FIG. 2, except that a message having a hyperlink for a telephone number string is being displayed in the visual display.

An example of a mobile device at step 408 of FIG. 5 is shown in FIG. 6. A message 502 which is an e-mail message is displayed in visual display 22 of mobile device 10. This message 502 is indicated as being sent to joe@rim.com (the end user of mobile device 10) from "Fred" having a telephone number of "888-2121" as provided at a bottom of message 502. The author (i.e. Fred) of this message 502 entered the telephone number as part of the text of his message. In response to a viewing of message 502 by "Fred", a hyperlink 506 was created for the telephone number string "888-2121", which is indicated by the underlining of the telephone number string. A cursor or position marker 504 is provided at a selected location in message 502. As shown in FIG. 6, cursor or position marker 504 is left at an end of the recipient's e-mail address joe@rim.com.

Figure 7:
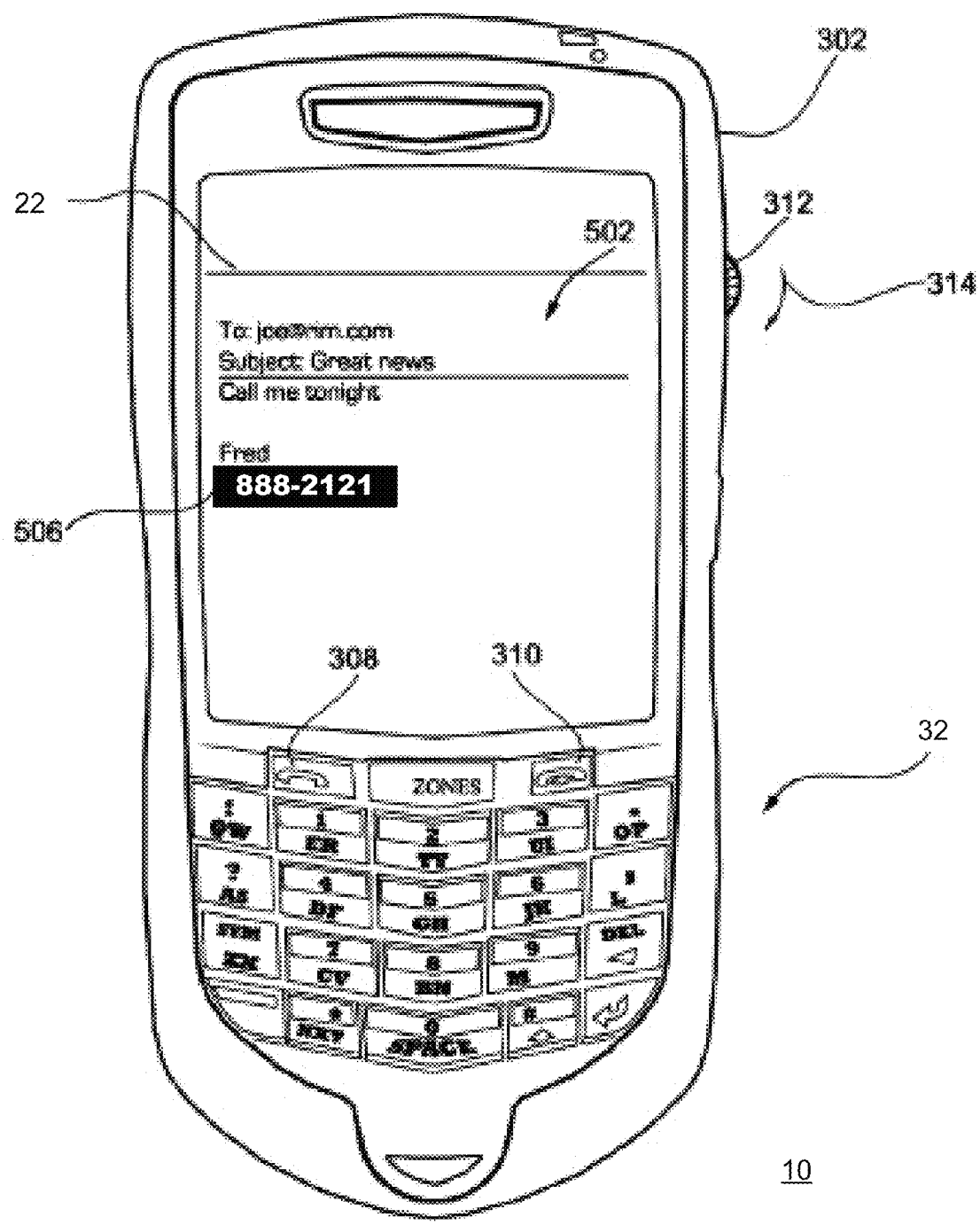
FIG. 7 is an illustration of the mobile device of FIG. 6, except that the hyperlink for the telephone number string is selected by the end user with use of a scrollwheel and highlighted in the visual display.

When message 502 is displayed, the end user may scroll through message 502 using a suitable viewing/selection mechanism of mobile device 10. Such scrolling moves the cursor or position marker 504 to a different location within message 502. In an example embodiment, the viewing/selection mechanism used by the end user is a scrollwheel 312 located on a side of the housing of the mobile device. Referring back to the flowchart of FIG. 5, if the cursor or position marker is positioned by the end user over the hyperlink for the telephone number string (step 410 of FIG. 5), the processor causes the hyperlink to be highlighted, marked, or otherwise emphasized in the visual display by the end user (step 412 of FIG. 5), see FIG. 7. The continuing example of the mobile device at step 412 of, FIG. 5 is shown in FIG. 7. Hyperlink 506 is shown as being highlighted or marked in response to the end user's selection of this information using scrollwheel 312.

Figure 8:
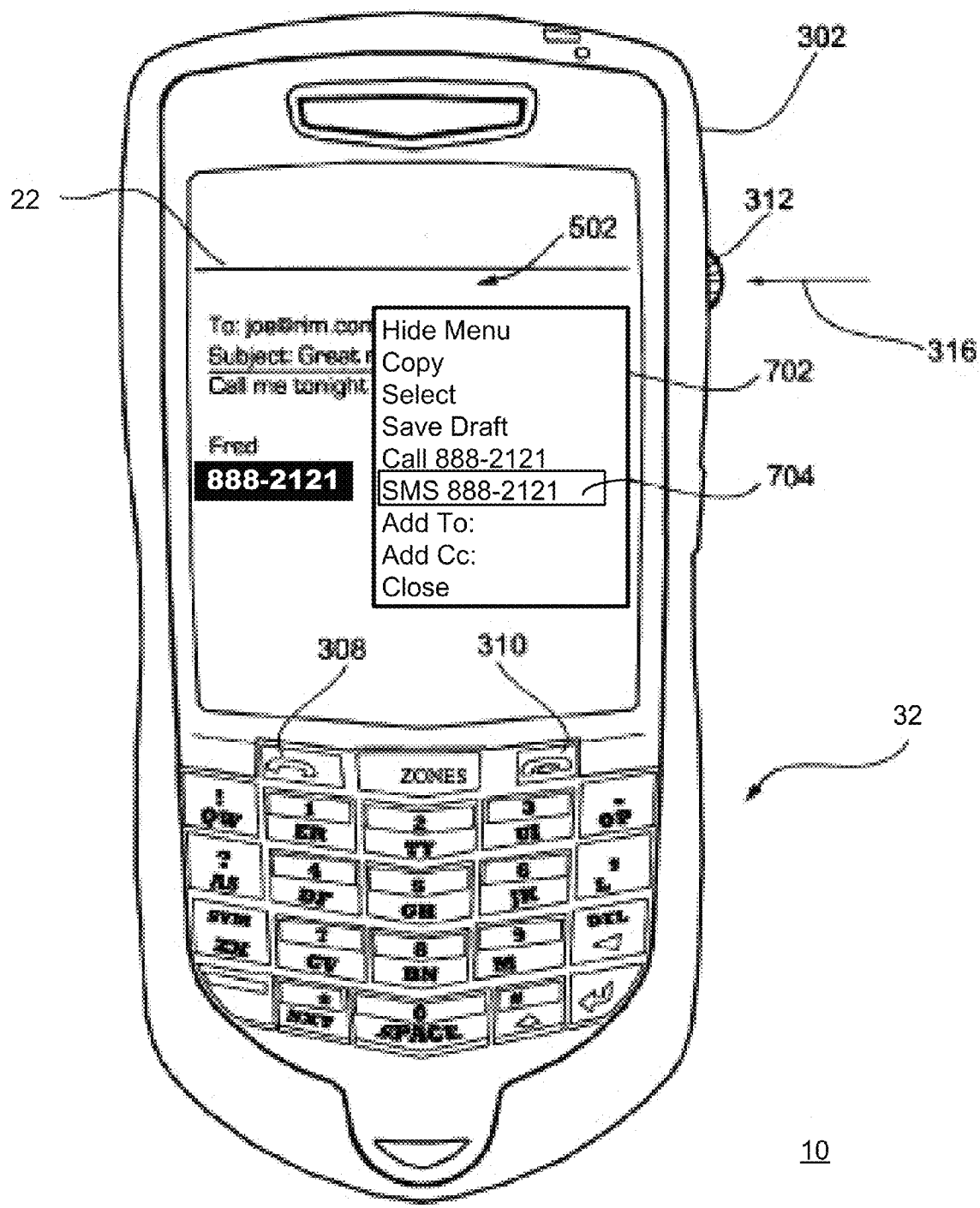
FIG. 8 is an illustration of the mobile device of FIG. 7, except that the scrollwheel has been depressed during the selection of the hyperlink to provide a list of functions for the telephone number string.

Referring back to the flowchart of FIG. 5, if the scrollwheel of the mobile device is depressed laterally while the hyperlink is selected (highlighted) (step 414 of FIG. 5), a list of functions for the telephone number string are visually displayed adjacent the message (step 422 of FIG. 5). A selected function from the list of functions may then be received and highlighted in the visual display by the mobile device (step 424 of FIG. 4). As shown in FIG. 8 for the continuing example, a list 702 of functions which are displayed in visual display 22 may be in the form of a pull-down menu. The list 702 may include functions such as "Copy", "Select", "Save Draft" "Call 888-2121", and "SMS 888-2121", etc. as shown. SMS is short for Short Message Service for sending of SMS messages. By rotating scrollwheel 312, the end user may scroll through the list 702 of functions to select one of them. In FIG. 8, it is shown that "SMS 888-2121" is selected from list 702 from the end user's rotation of scrollwheel 312.

Referring again back to the flowchart of FIG. 5, the mobile device identifies whether the scrollwheel is depressed during the selection of one of the functions in the list (step 426 of FIG. 5). If so, and a function other than a telephone call function was selected, then the mobile device processes this other selected function (step 428 of FIG. 5). For example, this other function may be an initiation of an SMS message to the telephone number (e.g. see FIG. 8). If the mobile device identifies that the scrollwheel is depressed during the selection of the telephone call function at step 426, however, then the mobile device initiates a telephone call to the telephone number string of the hyperlink through the wireless network (step 430 of FIG. 5).

Figure 9:
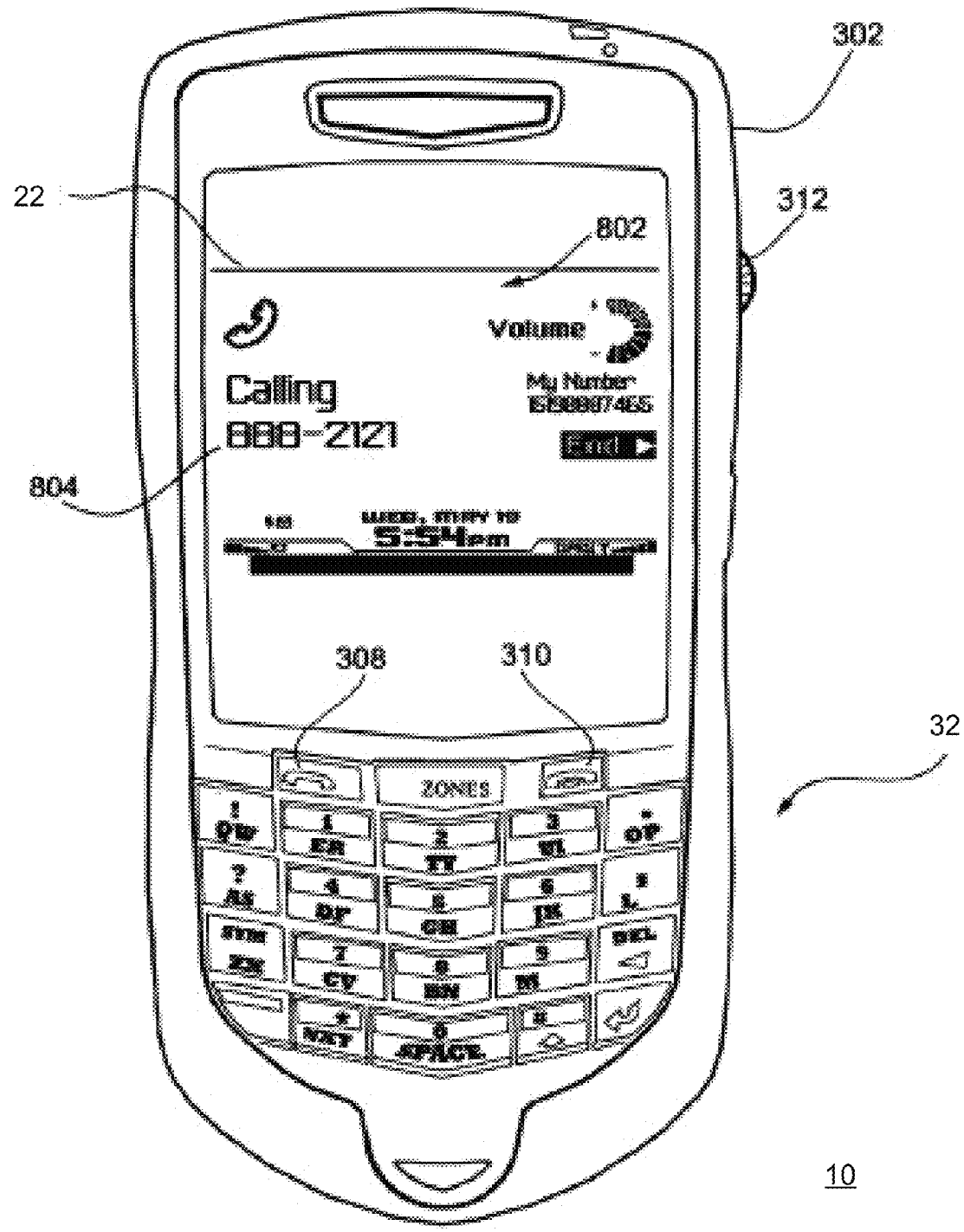
FIG. 9 is an illustration of the mobile device of FIG. 7, except that a SEND key has been depressed during the selection of the hyperlink to initiate a telephone call to the telephone number string.

As shown in FIG. 9 in the continuing example, telephone calling information 802 is displayed in visual display 22 after the end user initiation of the telephone calling function. The telephone calling information 802 includes visually displayed information such as the telephone number 804 that is being called. Note that it took two depressions of the scrollwheel key by the end user (the first depression of step 414 and the second depression of step 426), including a selection through the list of functions of the pull-down menu, in order to place the telephone call to the telephone number as described.

Back to the flowchart FIG. 5, note that the scrollwheel key need not be actuated at the point after the hyperlink of the telephone number string is selected and highlighted in step 412. Rather, the SEND key may be depressed and detected at step 416 of FIG. 5. In response to a single depression of this SEND key after the highlighting of the hyperlink for the telephone number string, the mobile device initiates a telephone call to the telephone number string through the wireless network (step 430 of FIG. 5). The actuation of the SEND key is performed following the end user selection of the hyperlink without any intervening key depressions. No function options are displayed for the end user; the initiation of the telephone call is immediate once the SEND key is depressed. Again as shown in FIG. 9 in the continuing example, telephone calling information 802 is displayed in visual display 22 after the end user initiation of the telephone calling function by depressing SEND key 310. The telephone calling information 802 includes visually displayed information such as the telephone number 804 that is being called. Again, it took only a single depression of the SEND key by the end user in order to place the telephone call to the telephone number as described, after the highlighting of the hyperlink. The call may be terminated by the depression of the END key 310 by the end user. Further in the flowchart, other keys may be actuated in lieu of the scrollwheel actuation at step 414 or the SEND key actuation at step 416 as identified at step 418, and these alternative functions may be processed accordingly (step 420 of FIG. 5).

In step 406 of FIG. 5, telephone numbers for hyper-linking are identified through a telephone number selection procedure in which all groups of numbers located with the body of message 502 are detected and compared against predetermined criteria to determine if the numbers are likely phone numbers, in which case the numbers are hyper-linked. For example, the predetermined criteria could require that a number string match at least one of a set or predetermined number patterns in order to be hyperlinked as a telephone number string. The pattern matching can require that a number string fall within a predetermined minimum and maximum length range (for example, a minimum of 6 numerical digits and a maximum of 15 numerical digits), and that the groups of numbers within the number strings as separated by white spaces (including periods, decimals, spaces, hyphens, commas, brackets and other punctuation) fall within known telephone number patterns. For example, in an example embodiment the following number patterns, which represent common North American telephone number formats, may be used to identify number strings as possible telephone numbers for hyperlinking (where N represents a numerical digit): NNN-NNNN; NNN.NNNN; NNNNNNN; NNN NNNN;

NNN-NNN-NNNN; NNN.NNN.NNNN; NNN NNN NNNN; and NNNNNNNNNN. In addition to pattern matching, in some embodiments the actual value of the numbers within the number string may be checked quantitatively to determine if the numbers meet known criteria for phone numbers, such as having leading digits that correspond to known country codes and area codes. By way of example, in one embodiment, the 10 or 7 digit numbers 519-888-2121 or 888-2121 would be identified as likely phone numbers and hyperlinked, whereas numbers such as 88 21 21 (not a known telephone number pattern) and 123-888-2121 (123 is not a valid area code) would not be identified as likely phone numbers, and would not be hyper-linked. Thus, only numbers that meet predetermined criteria indicative of phone numbers are identified for hyper-linking in steps 406 and 408. Selective hyper-linking avoids the user having to look at a screen in which every single number string is hyper-linked, and also can in some embodiments preserve on-board memory and processing resources of the device 10.

However, situations can arise where a user of the device 10 may want to initiate a call to a number contained in a message that has not been identified as a phone number in step 408, and hence not hyper-linked. For example, the device 10 may be a North American based device, and the criteria applied by the device to recognize phone numbers may not recognize local numbers outside of North America. In such a situation, if a local number is contained in an email message, and the user of device 10 has traveled to that destination, the user may want to dial the non-hyperlinked local number. In some situations, a telephone number may have been provided in an unconventional format that does not meet the pattern matching criteria used to identify numbers for hyperlinking, and the user may want to call the non-hyperlinked number. In this regard, reference will now be made to FIGS. 2 and 10-13 to describe an example embodiment that permits a user to easily initiate a call to a non-hyper-linked number that is contained in a message. In such example embodiment, the user of mobile device 10 can select a non-hyper-linked number string from a message for initiating a telephone call by positioning an on-screen cursor or position marker on one of the digits of the non-hyper-linked number string. Subsequent depression of the scrollwheel (or other selected input keys) will result in a call field being automatically populated with the non-hyper-linked number string that the position marker was located amongst the digits of.

In example embodiments, the method steps shown in the flow chart of FIG. 10 can be performed in conjunction with the method of FIG. 5 such that hyper-linked numbers are treated as described above, and non hyper-linked numbers are processed in the manner described below. At the start block 1002 of FIG. 10, a message that has been received at the mobile device is displayed in a visual display. The message may be an electronic mail (e-mail) message or information of a web page, as examples. FIG. 11 shows an example of an e-mail message 1102 that includes two number strings 1106 and 1108, one of which is the sender's telephone number as it should be dialed locally (number string 1106) and the other of which is the sender's number as it should be dialed from another country (number string 1106). The number string 1108, pursuant to steps 406 and 408 of the method of FIG. 5, is identified by mobile device 10 as a telephone number and a hyper-link is created for it, as signified by the dashed line shown under number string 1108 in FIG. 11. However, the number string 1106 is not recognized as a telephone number against the predetermined criteria applied by the mobile device 10, and accordingly, no hyper-link is created for number string 1106.

A cursor or position marker 504 is provided at a selected location in message 1102, and can be navigated through the message through rotation of the scrollwheel 312. As shown in FIG. 11, in the present example, a user of the device has positioned the cursor or position marker 504 at the first digit of number string 1106. In the method of FIG. 11, if the scrollwheel 312 of mobile device 12 is pressed when a message is being viewed, a determination is made whether the position marker 504 is located on a numerical digit that does not belong to a hyper-linked number (steps 1006 and 1008). (Hyper-linked numbers will be handled through the process of FIG. 5). If the position maker 504 is located on a numerical digit, the processor scans to the left and right of the digit, ignoring traditional telephone number punctuation such as periods, dashes and spaces, to identify the numerical string that the selected digit is part of and to determine if the numerical digit is part of number string that could, according to predetermined criteria, be a callable number (step 1012). In example embodiments, the criteria applied in step 1012 will be less stringent than the criteria applied in step 406 of the method of FIG. 5. For example, selecting a number string as meeting the criteria for a hyperlink in step 406 may require that the number string be within a certain minimum and maximum length range and match one of a number of predetermined patterns. However, in step 1012, the criteria may be pattern agnostic and simply be limited to requiring that the number string be within a certain minimum and maximum length range, and that range may be greater than the range that is applied in step 406. For example, in some embodiments number strings have to be at least 7 digits in length and match one of a number of predetermined patterns to be considered for hyper-linking, however for step 1012, the criteria may just be that a number string has to be at least 3 digits in length, ignoring any white spaces in the number string, to be considered a callable number. In some embodiments, step 1012 may be omitted completely, and the processor 38 simply be configured to assume that if the position marker 506 is on a digit, than the number string that the digit is part of is a callable number.

As indicated in steps 1010 and 1020, if the position marker 504 is not located on a numerical digit when the scrollwheel is depressed (step 1008), or if the numerical digit that the position marker 504 is located on is determined not to be a possible telephone number (step 1012), then a list of conventional functions are visually displayed adjacent the message and the user given the option to select a function (step 1010). For example, an option list 702 such as shown in FIG. 8 may be presented (without the "Call" or "SMS" options).

Figure 12:
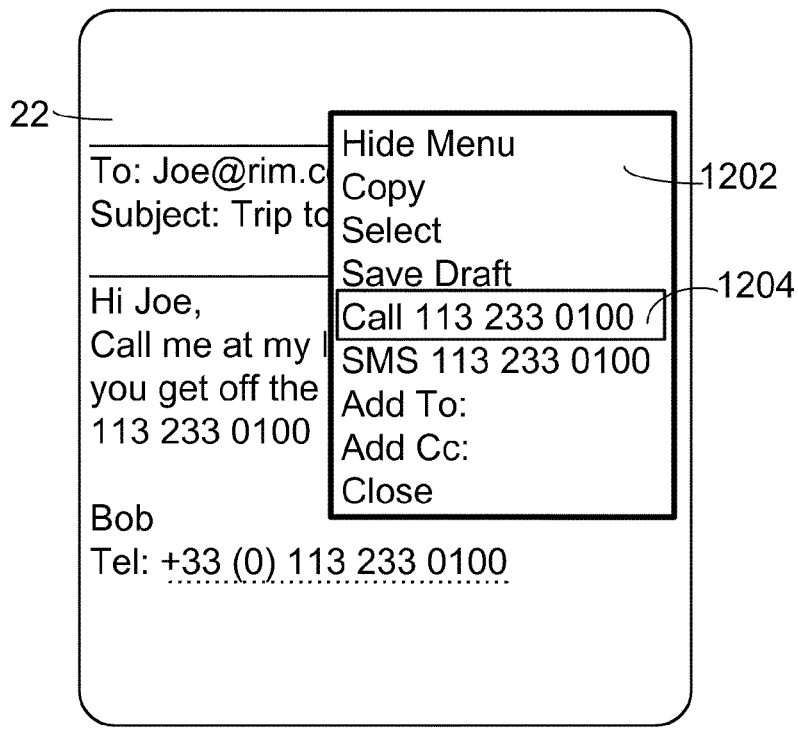
FIG. 12 is an illustration of the visual display of the mobile device of FIG. 11, except that the scrollwheel has been pressed while the cursor is located within the non-hyperlinked number to provide a list of functions for the telephone number string.

In the event that in step 1012 a determination is made that the cursor is located on number string that could be a callable number, then, as indicated in FIG. 12, a list 1202 of selectable functions is presented on display 22 which includes options of initiating a telephone call to the number string (step 1013). By way of example, in FIG. 12, the list 1202 of functions is displayed in visual display 22 in the form of a pull-down menu. The list 1202 may include functions such as "Copy", "Select", "Save Draft", "Call 113 233 0100", etc. as shown. As indicated in step 1014, by rotating scrollwheel 312, the end user may scroll through the list 1202 of functions to select one of them. In FIG. 12, it is shown that "Call 113 233 0100" is selected from list 1202 from the end user's rotation of scrollwheel 312. In some embodiments, the list 1202 is presented in step 1013 with the telephone call function 1204 highlighted by default so that the user can initiate the call simply by depressing the scrollwheel without having to rotate the scrollwheel.

Figure 10:
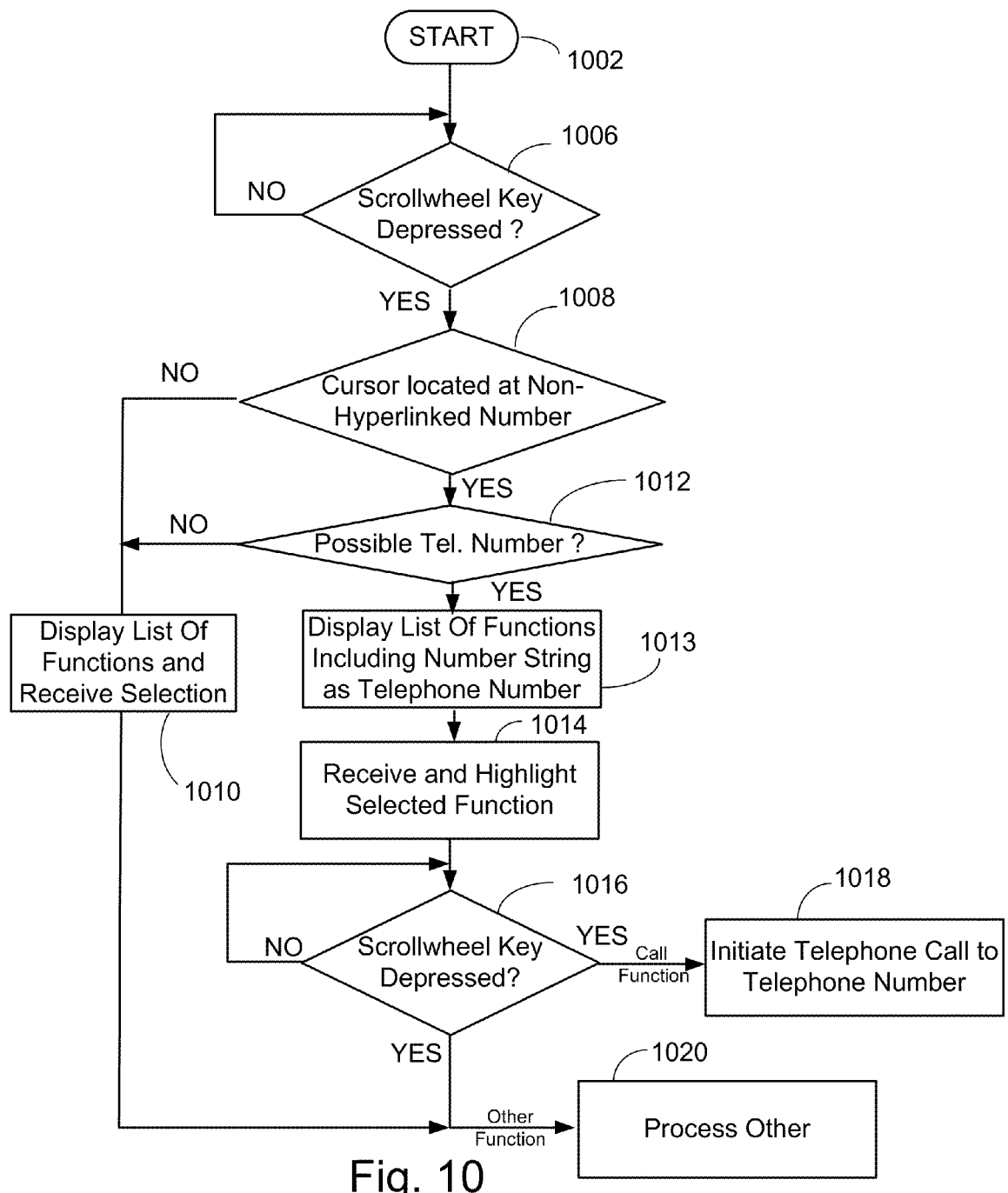
FIG. 10 is a flowchart which describes a further user interface method of initiating telephone calls from the mobile device of FIGS. 1-2.
Figure 11:
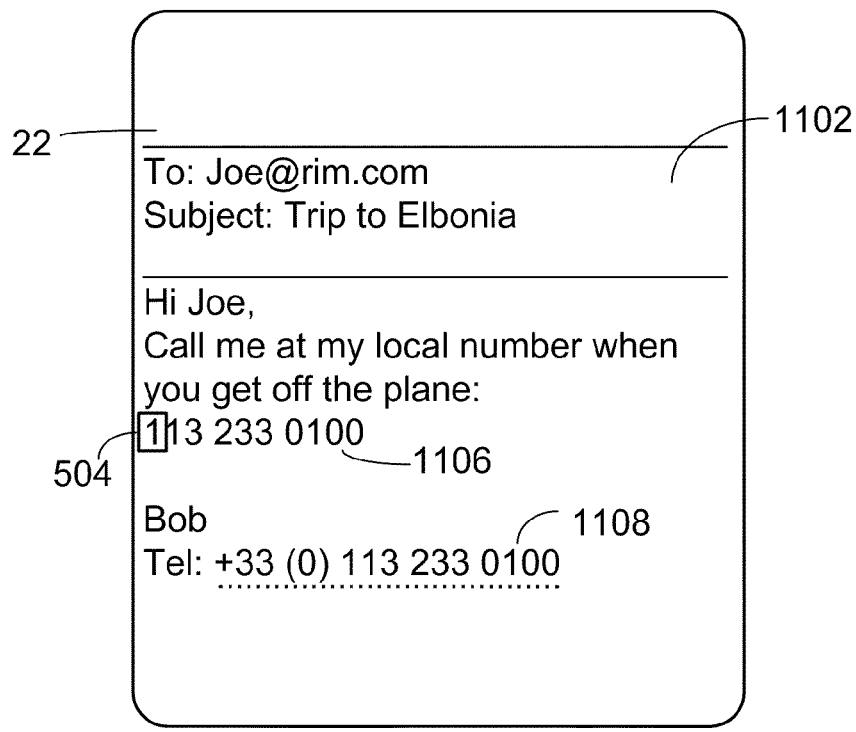
FIG. 11 is an illustration of a visual display of the mobile device of FIG. 2, with a message having a non-hyperlinked number string being displayed.

The mobile device identifies whether the scrollwheel is depressed during the selection of one of the functions in the list (step 1016 of FIG. 10). If so, and a function other than a telephone call function was selected, then the mobile device processes this other selected function (step 1020 of FIG. 10). For example, this other function may be an initiation of an SMS message to the number string that the position marker was located amongst. (E.g. see FIG. 8). If the mobile device identifies that the scrollwheel is depressed during the selection of the telephone call function at step 1016, however, then the mobile device 10 initiates a telephone call to the telephone number string of the hyperlink through the wireless network (step 1018 of FIG. 10). If a telephone call is initiated in step 1018, telephone calling information is displayed in visual display 22, such as for example shown in FIG. 9.

Thus, the steps shown in FIG. 10 provide a user of device 10 with the ability to move a cursor onto a non-hyperlinked displayed number and initiate a call simply by depressing the scrollwheel twice.

As indicated above, the mobile device 10 can be equipped with a dedicated CALL or SEND key 308, depression of which will in one step initiate a call to a hyper-linked number. In some example embodiments, the position of the cursor or location marker 504 relative to a non-hyper linked number set is irrelevant to the operation of the SEND key 308—in other words, the location of the location marker 594 within a non-hyperlinked number string will simply be ignored by the device 10 if the key 308 is pressed, and a conventional telephone number entry interface will appear (which for example, may include a field for the user to manually enter a telephone number, and also a displayed list of recently used telephone numbers that the user may select from).

In some alternative embodiments, however, one touch calling from a non-hyper-linked number may be available such that if a the user presses the SEND key 308 when the position marker 504 is located within a non-hyper-linked number string, a telephone call to that number string is immediately initiated provided that the number string meets a minimum criteria such as indicated above in respect of step 1012. Such an example will now be described with reference to the flowchart of FIG. 13 and the example screen display of FIG. 11. The method shown in FIG. 13 can be performed in conjunction with the methods of FIGS. 5 and 10.

Figure 13:
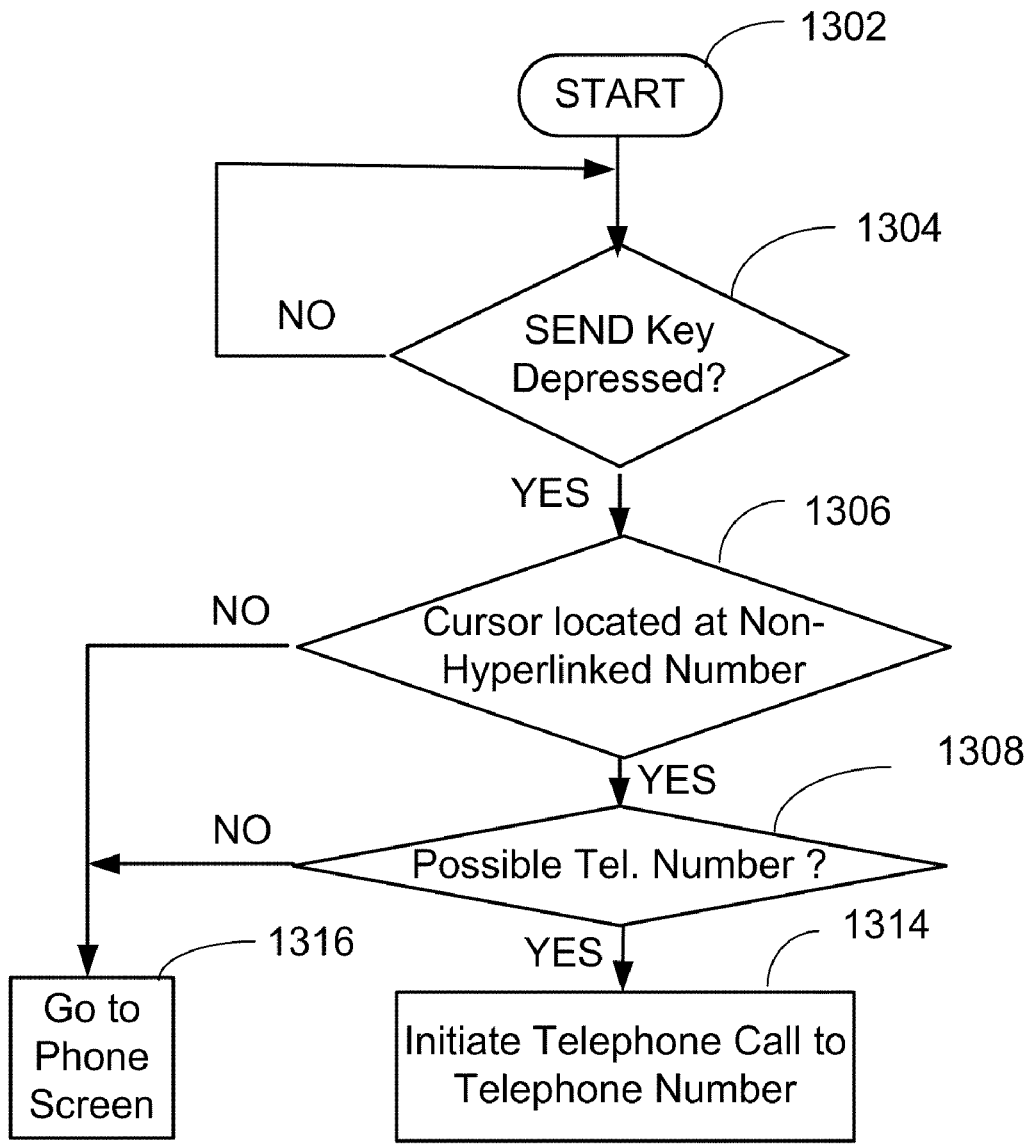
FIG. 13 is a flowchart which describes yet a further user interface method of initiating telephone calls from the mobile device of FIGS. 1-2.

Referring again to the example message of FIG. 11, in the method of FIG. 13, if the SEND key 308 of mobile device 12 is pressed when a message is being viewed, a determination is made whether the position marker 504 is located on a numerical digit that does not belong to a hyper-linked number (steps 1304 and 1306). (Hyper-linked numbers will be handled through the process of FIG. 5). If the position maker 504 is located on a numerical digit, the processor scans to the left and right of the digit, ignoring traditional telephone number punctuation such as periods, dashes and spaces, to identify the numerical string that the selected digit is part of and to determine if the numerical digit is part of number string that could, according to predetermined criteria, be a callable number (step 1308). In example embodiments, the criteria applied in step 1308 will be the same as those applied in step 1012 of the method of FIG. 10 and will be less stringent than the criteria applied in step 406 of the method of FIG. 5. However, in some embodiments, the criteria applied in step 1308 will be higher than those applied in step 1012 of the method of FIG. 10 and will be less stringent than the criteria applied in step 406 of the method of FIG. 5.

As indicated in steps 1306 and 1308, if the position marker 504 is not located on a numerical digit when the SEND key 308 is depressed (step 1306), or if the numerical digit that the position marker 504 is located on is determined not to be a possible telephone number (step 1308), then a conventional phone screen interface is displayed (step 1316) through which the device user can manually enter a phone number or select a number from a displayed list of recently used numbers.

In the event that in step 1308 a determination is made that when the SEND key 308 is pressed the cursor is located on number string that could be a callable number, then the mobile device immediately initiates a telephone call to the telephone number string through the wireless network (step 1310 of FIG. 11). In one example embodiment, the initiation of the call is performed immediately following the end user depression of the SEND key without any intervening key depressions. Once the call is initiated, telephone calling information is displayed in visual display 22 (see for example FIG. 8). The telephone calling information 802 includes visually displayed information such as the telephone number 804 that is being called. Again, it took only a single depression of the SEND key by the end user in order to place the telephone call to the telephone number as described, after the highlighting of the hyperlink. The call may be terminated by the depression of the END key 310 by the end user.

The examples described above have focused on selecting hyper-linked and non-hyper linked number strings from text contained in an email message. However, the methods described above can also be applied to number strings that are displayed in text that is not part of an email message, including for example web-pages, appointment book entries, task item entries, memo items, web pages, and other displayed text content.

The above-described embodiments of the present application are intended to be examples only. Those of skill in the art may effect alterations, modifications and variations to the particular embodiments without departing from the scope of the application. The present disclosure described herein in the recited claims intends to cover and embrace all suitable changes in technology.

The invention claimed is:

1. A method for initiating telephone calls from a mobile device which operates in a wireless communication network, the method comprising:
    determining without user intervention whether any number strings in text of a data item are telephone number strings according to first predetermined criteria;
    causing each number string in the text of the selected data item determined to be a telephone number string according to the first predetermined criteria to be displayed as a selectable hyperlinked number string;
    causing a telephone call to be initiated to a hyperlinked number string through the wireless communications network when first predetermined user input is detected;
    causing a list of user selectable functions to be displayed in response to detecting further predetermined user input when a position marker is located within a number string in the displayed text which does not meet the first predetermined criteria, the list of user selectable functions including a telephone call function for initiating a telephone call to the number string when the number string meets second predetermined criteria, wherein the second predetermined criteria are less stringent than the first predetermined criteria; and
    causing a telephone call to be initiated to a number string through the wireless communications network when the telephone call function for the number string is selected from the list of user selectable functions.

2. The method of claim 1, wherein the second predetermined criteria and first predetermined criteria require that the number string be within a certain minimum and maximum length range, and the range of the second predetermined criteria is greater than the range of the first predetermined criteria.

3. The method of claim 1, wherein the first predetermined criteria requires that the number string be within a certain minimum and maximum length range and match one of a number of predetermined patterns, the second predetermined criteria requires only that the number string be within a certain minimum and maximum length range, and the second predetermined criteria is greater than the range of the first predetermined criteria.

4. The method of claim 1, wherein the first predetermined user input is actuation of a SEND key.

5. The method of claim 1 wherein the further predetermined user input is depression of a depressible rotatable input mechanism.

6. The method of claim 1, wherein the list of user selectable functions does not include a telephone call function for initiating a telephone call to the number string when the number string does not meet second predetermined criteria.

7. The method of claim 1, wherein the list of user selectable functions includes an SMS function for initiating an SMS message to a number string, the method further comprising:
    causing an SMS message to be initiated to the number string through the wireless communications network when the SMS function is selected from the list of user selectable functions.

8. The method of claim 1, further comprising:
    causing a telephone call to be initiated to a number string in which the position marker is located through the wireless communications network when the first predetermined user input is detected and the number string meets third predetermined criteria.

9. The method of claim 8, wherein the second predetermined criteria are less stringent than the first predetermined criteria, and the third predetermined criteria are more stringent than the second predetermined criteria but less stringent than the first predetermined criteria.

10. The method of claim 8, wherein the first predetermined user input is actuation of a SEND key.

11. The method of claim 1 further comprising:
    determining if a hyperlinked number string is selected when second predetermined user input is detected and if so, causing a list of user selectable functions to be displayed, the list of user selectable functions including a telephone call function for initiating a telephone call to the selected hyperlinked number string; and
    causing a telephone call to be initiated to a hyperlinked number string through the wireless communications network when the second predetermined user input is detected when the telephone call function for the hyperlinked number string is selected from the list of user selectable functions.

12. The method of claim 11, wherein the second predetermined user input is depression of a depressible rotatable input mechanism.

13. The method of claim 11, wherein the list of user selectable functions includes an SMS function for initiating an SMS message to the hyperlinked number string when the hyperlinked number string is selected, the method further comprising:
    causing an SMS message to be initiated to the hyperlinked number string through the wireless communications network when the SMS function is selected from the list of user selectable functions.

14. A mobile device comprising:
    a controller;
    a wireless transceiver coupled to the controller for exchanging signals with a wireless communications network;
    a user interface coupled to the controller;
    a storage coupled to the controller and storing data items that include text containing at least one number string;
    a visual display coupled to the controller for displaying the text of data items stored in the storage;
    the controller being operative to:
        determine without user intervention whether any number strings in text of a data item are telephone number strings according to first predetermined criteria;
        cause each number string in the text of the selected data item determined to be a telephone number string according to the first predetermined criteria to be displayed as a selectable hyperlinked number string;
        cause a telephone call to be initiated to the hyperlinked number string through the wireless communications network when first predetermined user input is detected;
        cause a list of user selectable functions to be displayed in response to detecting further predetermined user input when a position marker is located within a number string in the displayed text which does not meet the first predetermined criteria, the list of user selectable functions including a telephone call function for initiating a telephone call to the number string when the number string meets second predetermined criteria, wherein the second predetermined criteria are less stringent than the first predetermined criteria; and
        cause a telephone call to be initiated to the number string through the wireless communications network when the telephone call function for the number string is selected from the list of user selectable functions.

15. The mobile device of claim 14, wherein the first predetermined criteria requires that the number string be within a certain minimum and maximum length range and match one of a number of predetermined patterns, the second predetermined criteria requires only that the number string be within a certain minimum and maximum length range, and the second predetermined criteria is greater than the range of the first predetermined criteria.

16. The mobile device of claim 14, further comprising:
    causing a telephone call to be initiated to a number string in which the position marker is located through the wireless communications network when the first predetermined user input is detected and the number string meets third predetermined criteria.

17. The mobile device of claim 16, wherein the second predetermined criteria are less stringent than the first predetermined criteria, and the third predetermined criteria are more stringent than the second predetermined criteria but less stringent than the first predetermined criteria.

18. A method for initiating telephone calls from a mobile device which operates in a wireless communication network, the method comprising:
    determining without user intervention whether any number strings in text of a data item are telephone number strings according to first predetermined criteria;
    causing each number string in the text of the selected data item determined to be a telephone number string according to the first predetermined criteria to be displayed as a selectable hyperlinked number string;

causing a telephone call to be initiated to a hyperlinked number string through the wireless communications network when first predetermined user input is detected; and causing a telephone call to be initiated to a number string through the wireless communications network when the telephone call function for the number string is selected from a list of user selectable functions and the number string meets second predetermined criteria, wherein the second predetermined criteria are less stringent than the first predetermined criteria; and causing a telephone call to be initiated to a number string in which a position marker is located through the wireless communications network when the first predetermined user input is detected and the number string meets third predetermined criteria; wherein the third predetermined criteria are more stringent than the second predetermined criteria but less stringent than the first predetermined criteria.

19. The method of claim 18, further comprising:

causing each number string in the text of the selected data item determined to be a telephone number string according to the second predetermined criteria to be displayed as a number string;

causing a list of user selectable functions to be displayed in response to detecting further predetermined user input when the position marker is located within a number string in the displayed text which does not meet the first predetermined criteria, the list of user selectable functions including a telephone call function for initiating a telephone call to the number string meets the second predetermined criteria.

* * * * *